United States Patent
Haeussler et al.

(10) Patent No.: US 9,278,821 B2
(45) Date of Patent: Mar. 8, 2016

(54) DEVICE AND METHOD FOR SUCTIONING A SHEET FROM A SHEET STACK AND SHEET-FED ROTARY PRINTING MACHINE AND PUNCH HAVING THE DEVICE

(71) Applicant: HEIDELBERGER DRUCKMASCHINEN AG, Heidelberg (DE)

(72) Inventors: Manfred Haeussler, Karlsruhe (DE); Burkhard Wolf, Dossenheim (DE); Andreas Mueller, Heidelberg (DE); Jochen Renner, Edingen-Neckarhausen (DE); Matthias Zapf, Heidelberg (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 14/618,125

(22) Filed: Feb. 10, 2015

(65) Prior Publication Data
US 2015/0225193 A1 Aug. 13, 2015

(30) Foreign Application Priority Data
Feb. 10, 2014 (DE) .................. 10 2014 001 756

(51) Int. Cl.
| B65H 3/08 | (2006.01) |
| B25J 15/06 | (2006.01) |
| B26F 1/02 | (2006.01) |
| B26D 7/01 | (2006.01) |

(52) U.S. Cl.
CPC ........... *B65H 3/0816* (2013.01); *B25J 15/0625* (2013.01); *B26D 7/018* (2013.01); *B26F 1/02* (2013.01); *B65H 3/08* (2013.01); *B65H 2406/30* (2013.01); *B65H 2406/351* (2013.01); *B65H 2406/36* (2013.01); *B65H 2406/364* (2013.01); *B65H 2406/3662* (2013.01)

(58) Field of Classification Search
CPC .......... B65H 3/00; B65H 3/08; B65H 3/0808; B65H 3/0816; B65H 3/14; B65H 2406/00; B65H 2406/30; B65H 2406/34; B65H 2406/343; B65H 2406/3432; B65H 2406/35; B65H 2406/351; B65H 2406/36; B65H 2406/364; B65H 2406/365; B65H 2406/3662; B26D 7/018; B25J 15/0625
See application file for complete search history.

(56) References Cited

U.S. PATENT DOCUMENTS

| 5,244,343 | A | * | 9/1993 | Lockert | ................. | B65H 29/36 271/194 |
| 5,685,534 | A |  | 11/1997 | Zeltner |  |  |
| 2004/0178567 | A1 | * | 9/2004 | Edinger | ................... | B65H 5/24 271/226 |
| 2005/0093223 | A1 | * | 5/2005 | Kashiba | .................. | B65H 3/10 271/90 |
| 2008/0164649 | A1 | * | 7/2008 | Forche | ................... | B41F 21/06 271/15 |
| 2011/0056804 | A1 | * | 3/2011 | Kearney | ............... | B65H 29/241 198/617 |
| 2011/0272877 | A1 | * | 11/2011 | Wardak | ................. | B65H 3/128 271/12 |

(Continued)

FOREIGN PATENT DOCUMENTS

| DE | 202011107531 U1 | 12/2011 |
| DE | 102012207285 A1 | 11/2013 |

(Continued)

*Primary Examiner* — Prasad Gokhale
(74) *Attorney, Agent, or Firm* — Laurence A. Greenberg; Werner H. Stemer; Ralph E. Locher

(57) ABSTRACT

A device and a method for raising and positioning an object, for example a sheet from a sheet stack, uses a whirlwind to generate a negative pressure for generating a retaining force and uses interference air for releasing the retaining force.

24 Claims, 3 Drawing Sheets

(56) References Cited

U.S. PATENT DOCUMENTS

2013/0106044 A1* 5/2013 Inoue ............... B65H 1/14 271/11
2013/0292894 A1* 11/2013 Enderle ............. B65H 29/6609 271/3.22
2015/0061309 A1* 3/2015 Kearney ............. B65G 47/91 294/185

FOREIGN PATENT DOCUMENTS

EP 0734983 A2 10/1996
WO 2013068307 A1 5/2013

* cited by examiner

DEVICE AND METHOD FOR SUCTIONING A SHEET FROM A SHEET STACK AND SHEET-FED ROTARY PRINTING MACHINE AND PUNCH HAVING THE DEVICE

CROSS-REFERENCE TO RELATED APPLICATION

This application claims the priority, under 35 U.S.C. §119, of German Patent Application DE 10 2014 001 756.7, filed Feb. 10, 2014; the prior application is herewith incorporated by reference in its entirety.

BACKGROUND OF THE INVENTION

Field of the Invention

The invention relates to a device and a method for suctioning a sheet, in particular for separating a sheet from a sheet stack. The invention also relates to a sheet-fed rotary printing machine and a punch having the device.

In feeders of machines for processing sheets, so-called suction heads are typically used for separating sheets from a sheet stack.

European Patent EP 0 734 983 B1, corresponding to U.S. Pat. No. 5,685,534, provides suction cups which are to be impinged or charged with suction air, which grasp the sheet and which are driven by a suction-element drive to transfer the sheet to a downstream conveying belt. The suction cups are supplied with suction air in a centralized manner from a suction-air generator.

German Utility Model DE 20 2011 107 531 U1, corresponding to International Publication No. WO 2013/068307 A1, shows a device for lifting an object, wherein the object clings to a housing by using a suction force. The suction force is generated directly in the housing by a rapidly rotating impeller. An adjustable aperture which is disposed on the housing is provided for releasing the retaining force.

SUMMARY OF THE INVENTION

It is accordingly an object of the invention to provide a device and a method for suctioning a sheet from a sheet stack and positioning an object and a sheet-fed rotary printing machine and a punch having the device, which overcome the hereinafore-mentioned disadvantages of the heretofore-known devices, methods, printing machines and punches of this general type and in which a retaining force is generated by an impeller and releasing the retaining force is controllable pneumatically.

With the foregoing and other objects in view there is provided, in accordance with the invention, a device for suctioning and positioning an object. The device comprises a housing having a suction opening formed therein, a device disposed in the housing for generating a negative pressure using a whirlwind for suctioning the object, and the housing having at least one flow duct for supplying or discharging interference air centrally into an interior of the whirlwind.

With the objects of the invention in view there is concomitantly provided a method for suctioning and positioning an object. The method comprises providing a housing having a suction opening formed therein, having at least one flow duct formed therein and having a ventilating device disposed therein, generating a negative pressure using the ventilating device creating a whirlwind suctioning the object through the suction opening, and supplying or discharging interference air through the at least one flow duct centrally into an interior of the whirlwind to disrupt the suctioning of the object.

It is a particular advantage of the invention that a tornado module which is configured by using an impeller is controllable in a pneumatic manner at a predetermined operational cycle rate, for example at the cycle rate of a machine processing sheets. In this case, a clocked interference air, for example a blown air or a suction air, is directed counter to the whirlwind generated by the impeller for suctioning an object, for example a sheet, in such a way that a previously generated negative-pressure area collapses.

The clocked interference air may be controlled by a rotary valve or solenoid valves.

Other features which are considered as characteristic for the invention are set forth in the appended claims.

Although the invention is illustrated and described herein as embodied in a device for suctioning a sheet from a sheet stack and a sheet-fed rotary printing machine and a punch having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
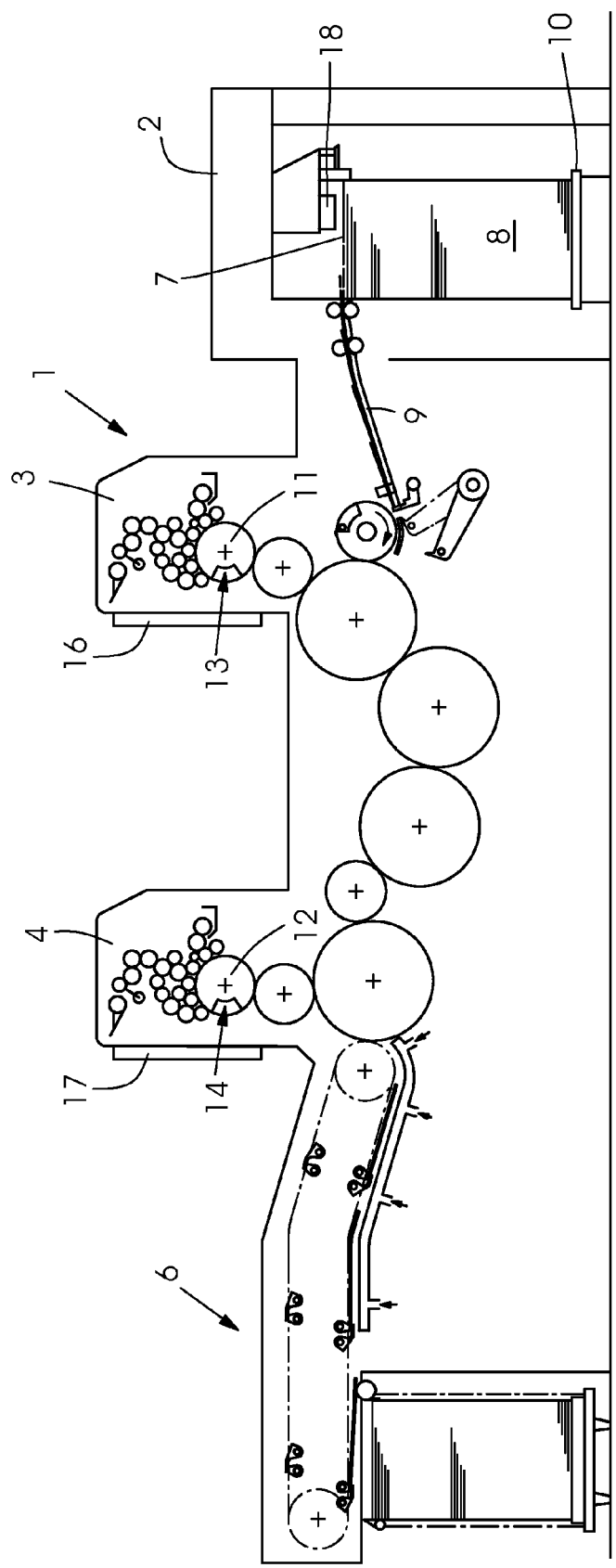
FIG. 1 is a diagrammatic, longitudinal-sectional view of a sheet-fed rotary printing machine.

Referring now to the figures of the drawings in detail and first, particularly, to FIG. 1 thereof, there is seen a machine, for example a printing machine 1, for processing sheets 7, having a feeder 2, at least one respective printing unit 3 and 4 and a delivery 6. The sheets 7 are removed from a sheet stack 8 and separated or fed in an imbricate manner over a feed table 9 to the printing units 3 and 4. The printing units 3 and 4 each contain a plate cylinder 11, 12, in a known manner. The plate cylinders 11 and 12 in each case have a device 13, 14 for fastening flexible printing plates. Moreover, each plate cylinder 11, 12 is assigned a device 16, 17 for semi-automatically or fully automatically changing printing plates.

The sheet stack 8 lies on a main stack plate 10 which can be raised in a controlled manner. Removal of the sheets 7 takes place from the upper side of the sheet stack 8, by using at least one gripper 18 which can be pneumatically charged. Moreover, blowing devices for loosening upper sheet layers are provided with sensing elements for stack tracking. A number of lateral and rear stops are provided for orienting the sheet stack 8, in particular the upper sheets 7 of the sheet stack 8.

Figure 2:
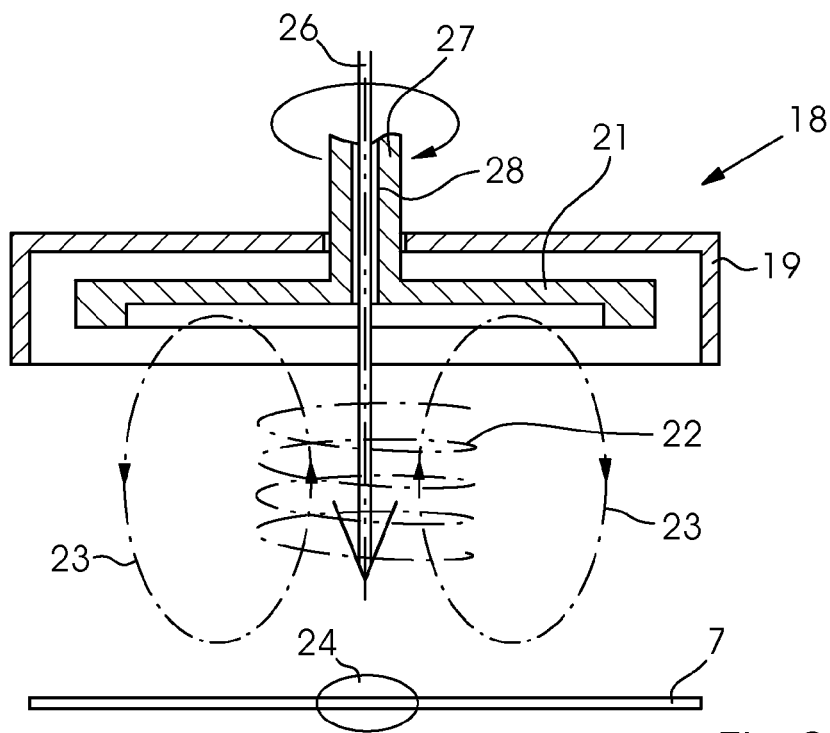
FIG. 2 is an enlarged, vertical-sectional view of a tornado module according to the invention, having central interference air.

According to FIG. 2, the pneumatic gripper 18 is composed substantially of a housing 19 in which a rapidly rotating impeller 21 is disposed. The housing is configured so as to be open toward the bottom, in the direction of the object to be raised, for example a sheet 7 to be separated or singularized, in such a way that a first air circuit (whirlwind) which is generated by the impeller 21 and which corresponds to a tornado whirlwind can be generated. The first air circuit 22 itself generates a second air circuit 23, by way of which a negative-pressure area 24 is generated.

The negative-pressure area 24 is utilized for suctioning and retaining the sheet 7.

In order to release the suction force and thus to let go of the sheet 7, the air circuits 22, 23 are interrupted by regulated interference air 26 (for example, blowing air). Due to this measure, the negative-pressure area 24 collapses and the sheet 7 is surrendered by the gripper 18.

In the case of the exemplary embodiment according to FIG. 2, the interference air 26 is supplied centrally into the interior of the tornado or first air circuit 22 by using a flow duct 28 which is disposed in a drive shaft 27 of the impeller 21. The interference air 26 is thus directed counter to the rotational direction of the second air circuit 23, due to which the negative-pressure area 24 is cancelled or released.

Figure 3:
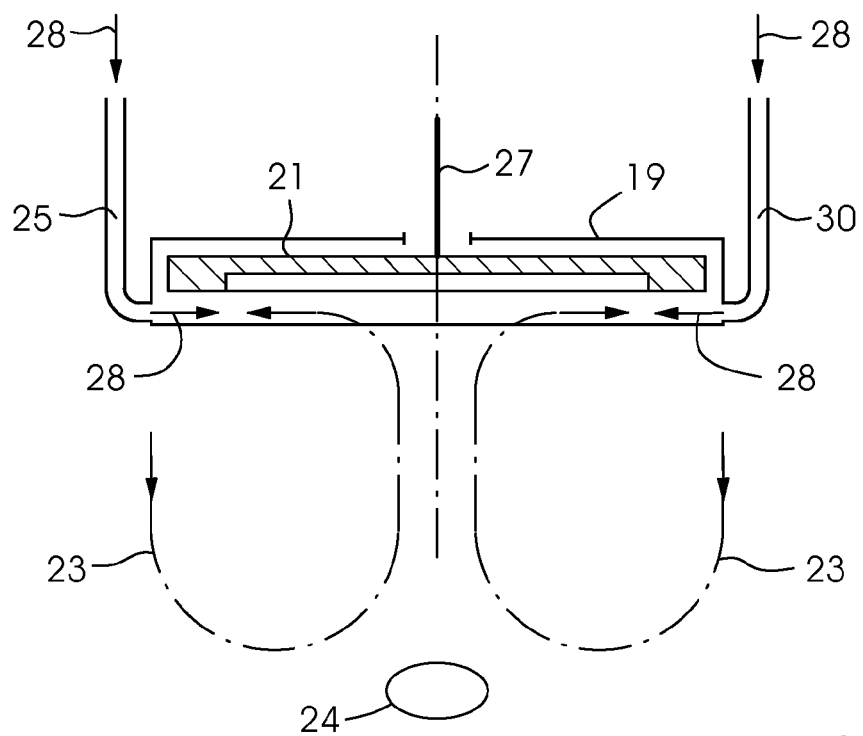
FIG. 3 is a vertical-sectional view of a tornado module having lateral interference air.

A second exemplary embodiment according to FIG. 3 provides for two interference air flows 28 which are directed counter to the second flow circuit 23 to be generated. The two interference air flows 28 are supplied to the housing 19 by using laterally disposed flow ducts 25, 30.

Figure 4:
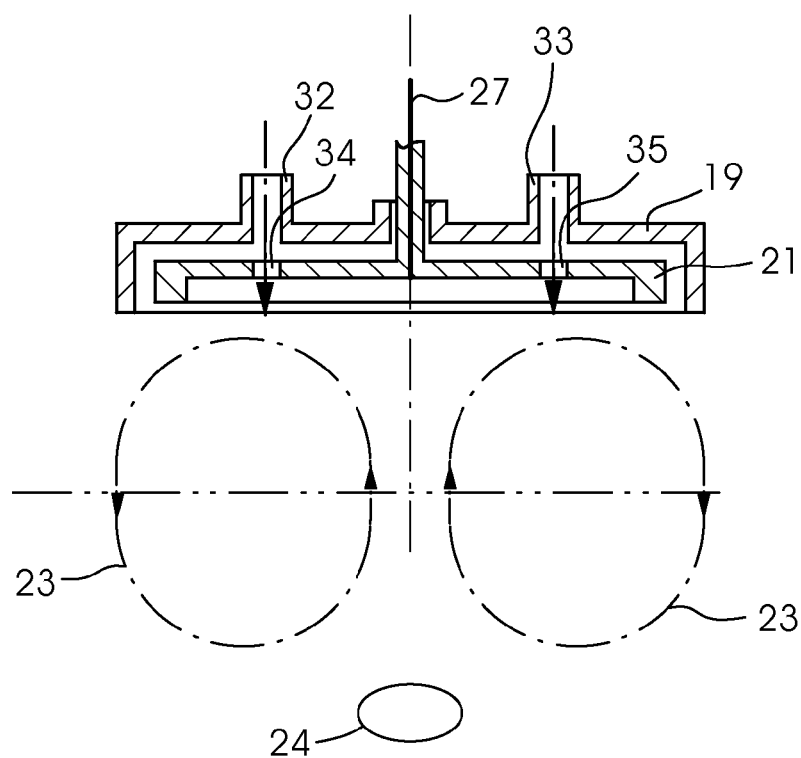
FIG. 4 is a vertical-sectional view of a tornado module having a plurality of interference air supply ducts.

In the case of the exemplary embodiment according to FIG. 4 it is provided that two interference air flows 32, 33 are supplied to the housing 19 in a decentralized manner. The interference air flows 32, 33 make their way through passage arcs or conduits 34, 35 into the effective region of the impeller 21, in such a way that the second flow circuits 23 which are generated by the latter are disturbed, due to which the negative-pressure area 24 collapses.

Figure 5:
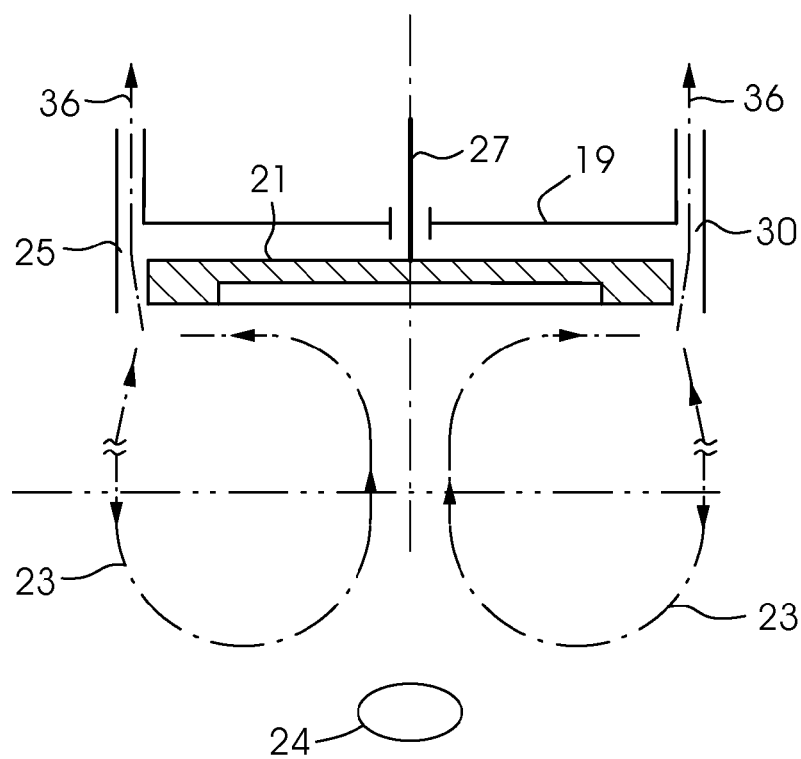
FIG. 5 is a vertical-sectional view of a tornado module having suction ducts.

An exemplary embodiment according to FIG. 5 provides for suction air to be used as interference air 36, for example. In this case, the lateral flow ducts 25, 30 are impinged upon by suction air, due to which the second air flow circuit 23 is disturbed, in such a way that the negative-pressure area 24 collapses.

In all of the exemplary embodiments according to FIGS. 2 to 5 it is provided for the interference air (suction air 36, blowing air 26) to be made available in a clocked or timed manner, in particular at the cycle rate of the machine 1 processing the sheets. Rotary valves or control valves operating with solenoids are particularly suitable for generating clocked or timed air flows, as illustrated in FIG. 4.

The use of the device described above on a machine for processing sheets is particularly advantageous for retaining and separating sheets from a sheet stack, for example of a sheet-fed rotary printing machine 1, a punch, or a folding machine.

The invention claimed is:

1. A device for suctioning and positioning an object, the device comprising:
   a housing having a suction opening formed therein;
   a device disposed in said housing for generating a negative pressure using a whirlwind for suctioning the object, said device for generating said whirlwind being a rapidly rotating impeller having a drive shaft; and
   said housing having at least one flow duct disposed in said drive shaft for supplying or discharging interference air centrally into an interior of said whirlwind.

2. The device according to claim 1, wherein said interference air is supplied at a cycle rate of a machine processing sheets.

3. The device according to claim 2, which further comprises a rotary valve or a solenoid valve generating said cycle rate of said interference air.

4. A sheet-fed rotary printing machine, comprising:
   a device according to claim 1 for raising and separating sheets from a sheet stack.

5. A punch, comprising:
   a device according to claim 1 for raising and separating sheets from a sheet stack.

6. A device for suctioning and positioning an object, the device comprising:
   a housing having a suction opening formed therein;
   a device disposed in said housing for generating a negative pressure using a whirlwind for suctioning the object, said device for generating said whirlwind being a rapidly rotating impeller; and
   said housing having two flow ducts decentralized in said housing and communicating with through-openings formed in said impeller for supplying or discharging interference air centrally into an interior of said whirlwind.

7. The device according to claim 6, wherein said two flow ducts are disposed diametrically laterally opposite each other in said housing.

8. The device according to claim 7, wherein said flow ducts are charged with suction air.

9. The device according to claim 7, wherein said flow ducts are charged with blowing air.

10. The device according to claim 6, wherein said interference air is supplied at a cycle rate of a machine processing sheets.

11. The device according to claim 10, which further comprises a rotary valve or a solenoid valve generating said cycle rate of said interference air.

12. A sheet-fed rotary printing machine, comprising:
   a device according to claim 6 for raising and separating sheets from a sheet stack.

13. A punch, comprising:
   a device according to claim 6 for raising and separating sheets from a sheet stack.

14. A method for suctioning and positioning an object, the method comprising the following steps:
   providing a housing having a suction opening formed therein and having an impeller as a ventilating device disposed therein, the impeller having a drive shaft and at least one flow duct formed in the drive shaft of the impeller;
   generating a negative pressure by rapidly rotating the impeller as the ventilating device creating a whirlwind suctioning the object through the suction opening; and
   supplying or discharging interference air through the at least one flow duct centrally into an interior of the whirlwind to disrupt the suctioning of the object by guiding the interference air through the at least one flow duct formed in the drive shaft of the impeller.

15. The method according to claim 14, which further comprises charging the flow ducts with suction air.

16. The method according to claim 14, which further comprises supplying the interference air at a cycle rate of a machine processing sheets.

17. The method according to claim 16, which further comprises generating the cycle rate of the interference air using a rotary valve or a solenoid valve.

18. A method for suctioning and positioning an object, the method comprising the following steps:
- providing a housing having a suction opening formed therein, having an impeller as a ventilating device disposed therein and having two flow ducts decentralized in the housing and communicating with through-openings formed in the impeller;
- generating a negative pressure by rapidly rotating the impeller as the ventilating device creating a whirlwind suctioning the object through the suction opening; and
- supplying or discharging interference air through the at least one flow duct centrally into an interior of the whirlwind to disrupt the suctioning of the object.

19. The method according to claim 18, which further comprises charging the flow ducts with suction air.

20. The method according to claim 18, which further comprises supplying the interference air at a cycle rate of a machine processing sheets.

21. The method according to claim 20, which further comprises generating the cycle rate of the interference air using a rotary valve or a solenoid valve.

22. A method for suctioning and positioning an object, the method comprising the following steps:
- providing a housing having a suction opening formed therein, having an impeller as a ventilating device disposed therein and having two flow ducts disposed diametrically laterally opposite each other in the housing;
- generating a negative pressure by rapidly rotating the impeller as the ventilating device creating a whirlwind suctioning the object through the suction opening; and
- charging the flow ducts with blowing interference air through the two flows ducts centrally into an interior of the whirlwind to disrupt the suctioning of the object.

23. The method according to claim 22, which further comprises supplying the interference air at a cycle rate of a machine processing sheets.

24. The method according to claim 23, which further comprises generating the cycle rate of the interference air using a rotary valve or a solenoid valve.

* * * * *